United States Patent
Ma et al.

(10) Patent No.: US 8,149,581 B2
(45) Date of Patent: Apr. 3, 2012

(54) KEYBOARD AND DISPLAY SCREEN IN SEPARATE HOUSINGS CONNECTED BY CAM ASSEMBLIES THAT TILT RESPONSIVE TO MOVEMENT BETWEEN THE HOUSINGS

(75) Inventors: Yawei Ma, San Diego, CA (US); Ichiro Yamada, Del Mar, CA (US)

(73) Assignee: Sony Ericssom Mobile Communications AB (SE)

( * ) Notice: Subject to any disclaimer, the term of this patent is extended or adjusted under 35 U.S.C. 154(b) by 356 days.

(21) Appl. No.: 12/641,702

(22) Filed: Dec. 18, 2009

(65) Prior Publication Data

US 2011/0149484 A1    Jun. 23, 2011

(51) Int. Cl.
*H05K 7/16* (2006.01)
*H04B 1/00* (2006.01)

(52) U.S. Cl. ........ 361/727; 361/726; 361/732; 361/759; 361/679.01; 361/801; 361/802; 361/803; 455/550.1; 455/575.8; 455/90.3; 455/575.1; 455/575.2; 455/575.3; 455/575.4

(58) Field of Classification Search .......... 361/801–803, 361/726, 732, 747, 759, 679.01, 727; 429/96, 429/97, 100; 455/550.1, 575.8, 90.3, 575.1–575.4
See application file for complete search history.

(56) References Cited

U.S. PATENT DOCUMENTS

| | | | | |
|---|---|---|---|---|
| 5,019,465 A | * | 5/1991 | Herron et al. | 429/97 |
| 6,556,436 B2 | * | 4/2003 | Ohnishi | 361/679.43 |
| 7,278,184 B2 | * | 10/2007 | Kuramochi | 16/357 |
| 7,526,082 B2 | * | 4/2009 | Abe et al. | 379/433.11 |
| 2006/0193469 A1 | * | 8/2006 | Kfoury | 379/433.13 |

FOREIGN PATENT DOCUMENTS

| | | |
|---|---|---|
| EP | 1 783 984 A1 | 5/2007 |
| EP | 2 120 425 A1 | 11/2009 |
| WO | WO 00/38332 A1 | 6/2000 |

OTHER PUBLICATIONS

International Search Report and the Written Opinion of the International Searching Authority corresponding to International Application No. PCT/IB2010/003052; Date of Mailing: Apr. 27, 2011; 9 Pages.

* cited by examiner

*Primary Examiner* — Hung S Bui
*Assistant Examiner* — James Wu
(74) *Attorney, Agent, or Firm* — Myers Bigel Sibley & Sajovec, P.A.

(57) ABSTRACT

An electronic device includes separate housings, one includes a keyboard and the other includes a display screen, a pair of cam assemblies and a pair of actuator arms. Each cam assembly has first and second connection parts that are rotationally connected, and are configured so that the first and second connection parts tilt relative to each other responsive to rotation of one relative to the other. The first connection parts of both cam assemblies are connected to spaced apart locations on the first housing. The actuator arms are connected on one end to spaced apart locations on the second housing and are connected on the other end to different ones of the second connection parts of both cam assemblies. Relative movement of the first and second housings rotates the first connection part relative to the second connection part of both cam assemblies and tilts the first housing relative to the second housing.

19 Claims, 5 Drawing Sheets

KEYBOARD AND DISPLAY SCREEN IN SEPARATE HOUSINGS CONNECTED BY CAM ASSEMBLIES THAT TILT RESPONSIVE TO MOVEMENT BETWEEN THE HOUSINGS

FIELD OF THE INVENTION

This invention relates to user interfaces for electronic devices, and more particularly to electronic devices having a display and keyboard in separate housings that are movable relative to one another.

BACKGROUND OF THE INVENTION

Many electronic devices, such as wireless communication terminals, include a keyboard and a display screen that are located in separate housings that can be slid between open and closed arrangements. For example, the keyboard may be covered by the display screen in a closed arrangement, and the housings can be slid apart to an open arrangement to uncover the keyboard and allow typing thereon by a user. As the housings are slid back and forth, an underside of the display housing can rub the keyboard keys, which may interfere with movement of the housings and/or cause undesirably wear to key surfaces. Because of the limited viewable angle of some display screens, when a user's eyes are aligned with the keyboard while typing they may not be sufficiently aligned with the spaced apart display screen to allow clear viewing of what is displayed thereon.

SUMMARY OF THE INVENTION

Various embodiments of the present invention are directed to an electronic device that includes separate housings, one includes a keyboard and the other includes a display screen. The housings are tilted at varying angles and the spacing between them can be varied responsive to moving the keyboard and display screen relative to each other. Tilting one housing relative to the other may improve viewing of images that are displayed on the display screen while a user's eyes are also positioned to view the keyboard for typing. Increasing the spacing between the housings as they are slid apart may reduce/avoid interference to their movement from keyboard collision and/or may reduce/avoid one of the housings wearing away an upper surface of the keyboard.

In some embodiments, an electronic device includes a pair of cam assemblies and a pair of actuator arms. Each cam assembly has first and second connection parts that are rotationally connected, and are configured so that the first and second connection parts tilt relative to each other responsive to rotation of one relative to the other. The first connection parts of both cam assemblies are connected to spaced apart locations on the first housing. The actuator arms are connected on one end to spaced apart locations on the second housing and are connected on the other end to different ones of the second connection parts of both cam assemblies. Relative movement of the first and second housings rotates the first connection part relative to the second connection part of both cam assemblies and tilts the first housing relative to the second housing.

In some further embodiments, the cam assemblies are further configured to tilt the first housing in a first angular direction relative to the second housing in response to sliding the first housing relative to the second housing in a first direction, and are configured to tilt the first housing in an opposite second angular direction relative to the second housing in response to sliding the first housing relative to the second housing in an opposite second direction.

In some further embodiments, the cam assemblies are further configured to increase separation between the first and second housings in response to sliding the first housing relative to the second housing in the first direction, and are configured to decrease separation between the first and second housings in response to sliding the first housing relative to the second housing in the second direction.

In some further embodiments, the first housing includes the keyboard and the second housing includes the display screen. The cam assemblies are configured to tilt the display screen of the second housing toward the keyboard of the second housing responsive to the first and second housings being slid toward an open arrangement that exposes the keyboard from underneath the display screen.

In some further embodiments, the cam assemblies slide along a corresponding pair of slots that are defined in an exterior surface of the second housing as the first and second housings are moved relative to each other in a direction along the slots. The actuator arms extend between the display screen and the exterior surface of the second housing.

In some further embodiments, the cam assemblies are configured to tilt the display screen of the second housing away from the keyboard of the first housing responsive to the first and second housings being slid toward a closed arrangement that covers the keyboard underneath the display screen.

In some further embodiments, the cam assemblies are configured to hold the first and second housings parallel to each other with a corresponding 0 degree tilt angle responsive to the second housing overlying the keyboard of the first housing, and are configured to tilt the display screen of the second housing at least 7 degrees toward the keyboard of the first housing in response to the first and second housings being slid to the open arrangement that exposes the keyboard from underneath the second housing.

In some further embodiments, the cam assemblies are configured to increase separation between facing surfaces of the first and second housings responsive to the first and second housings being slid toward the open arrangement, and to decrease separation between facing surfaces of the first and second housings responsive to the first and second housings being slid toward the closed arrangement.

In some further embodiments, the cam assemblies are configured to increase separation between facing surfaces of the first and second housings by at least 1 mm as the first and second housings are slid from the closed arrangement to the open arrangement, and are further configured to decrease separation between facing surfaces of the first and second housings by at least 1 mm as the first and second housings are slid from the open arrangement to the closed arrangement.

In some further embodiments, the first connection part of each cam assembly has a cylindrical portion with a sloped face. The second connection part of each cam assembly includes a flange that presses against and rides along the sloped face of the first connection part as the first connection part is rotated relative to the second connection part to tilt the first connection part relative to the second connection part and tilt the first housing relative to the second housing.

In some further embodiments, each cam assembly further includes a cylindrical spring that extends around a portion of the first connection part and presses the flange of the second connection part against the sloped face of the first connection part to tilt the first connection part relative to the second connection part as the first and second connection parts are rotated relative to each other.

In some further embodiments, the second connection part includes a cylindrical portion that is axially aligned with the cylindrical portion of the first connection part, the cylindrical portion of the second connection part has a sloped face that is spaced apart on an opposite side of an exterior surface of the second housing from the sloped face of the first connection part. The first cylindrical part includes a flange that presses against and rides along the sloped face of the second connection part as the first connection part is rotated relative to the second connection part to push the sloped face of the second connection part away from the exterior surface of the second housing and regulate separation between the first and second housings as the first and second housings are moved relative to each other.

In some further embodiments, the cam assemblies slide along a corresponding pair of slots that are defined in an exterior surface of the second housing as the first and second housings are moved relative to each other in a direction along the slots. The slots guide the sliding movement of the cams as the first and second housing are moved relative to each other in the direction along the slots. The cam assemblies extend through the slots to rotationally connect the first housing and the end of the actuator arm.

In some further embodiments, sliding the first housing relative to the second housing rotates the actuator arms in opposite relative directions and causes rotation between the first and second connection parts of a first one of the cam assemblies in a clockwise direction and causes rotation between the first and second connection parts of a second one of the cam assemblies in a counter-clockwise direction. The first cam assembly is configured to respond to clockwise rotation by tilting its first connection part in a first direction relative to the second connection part and the second cam assembly is configured to respond to counter-clockwise rotation by tilting its first connection part in the first direction relative to the second connection part.

In some further embodiments, the electronic device further includes a display circuit that resides in the first housing and is configured to generate signals that regulate images displayed by the display screen, and display wires that extend from the display circuit through at least one of the cam assemblies interconnecting the first and second housings to electrically connect to the display screen.

In some other embodiments, an electronic device includes first and second housings, where one of first and second housings includes a keyboard and the other housing includes a display screen. A pair of cam assemblies each having first and second connection parts that are rotationally connected. Each cam assembly is configured so that the first and second connection parts tilt relative to each other responsive to rotation of one relative to the other. The first connection parts of both cam assemblies are connected to spaced apart locations on the first housing. A pair of actuator arms are connected on one end to spaced apart locations on the second housing and are connected on the other end to different ones of the second connection parts of both cam assemblies. Relative movement of the first and second housings rotates the first connection part relative to the second connection part of both cam assemblies and tilts the first housing relative to the second housing. The cam assemblies are further configured to tilt the first housing in a first angular direction relative to the second housing and to increase separation between the first and second housings in response to sliding the first housing relative to the second housing in a first direction, and are configured to tilt the first housing in an opposite second angular direction relative to the second housing and to decrease separation between the first and second housings in response to sliding the first housing relative to the second housing in an opposite second direction.

In some further embodiments, the first housing includes the keyboard and the second housing includes the display screen. The cam assemblies are configured to tilt the display screen of the second housing toward the keyboard of the second housing and to increase separation between facing surfaces of the first and second housings in response to the first and second housings being slid toward an open arrangement that exposes the keyboard from underneath the display screen.

In some further embodiments, the cam assemblies are configured to tilt the display screen of the second housing away from the keyboard of the second housing and to decrease separation between facing surfaces of the first and second housings in response to the first and second housings being slid toward a closed arrangement that covers the keyboard underneath the display screen.

In some further embodiments, sliding the first housing relative to the second housing rotates the actuator arms in opposite relative directions and causes rotation between the first and second connection parts of a first one of the cam assemblies in a clockwise direction and causes rotation between the first and second connection parts of a second one of the cam assemblies in a counter-clockwise direction. The first cam assembly is configured to respond to clockwise rotation by tilting its first connection part in a first direction relative to the second connection part and the second cam assembly is configured to respond to counter-clockwise rotation by tilting its first connection part in the first direction relative to the second connection part.

Other electronic devices and components according to embodiments of the invention will be or become apparent to one with skill in the art upon review of the following drawings and detailed description. It is intended that all such additional electronic devices and components be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS

Figure 1:
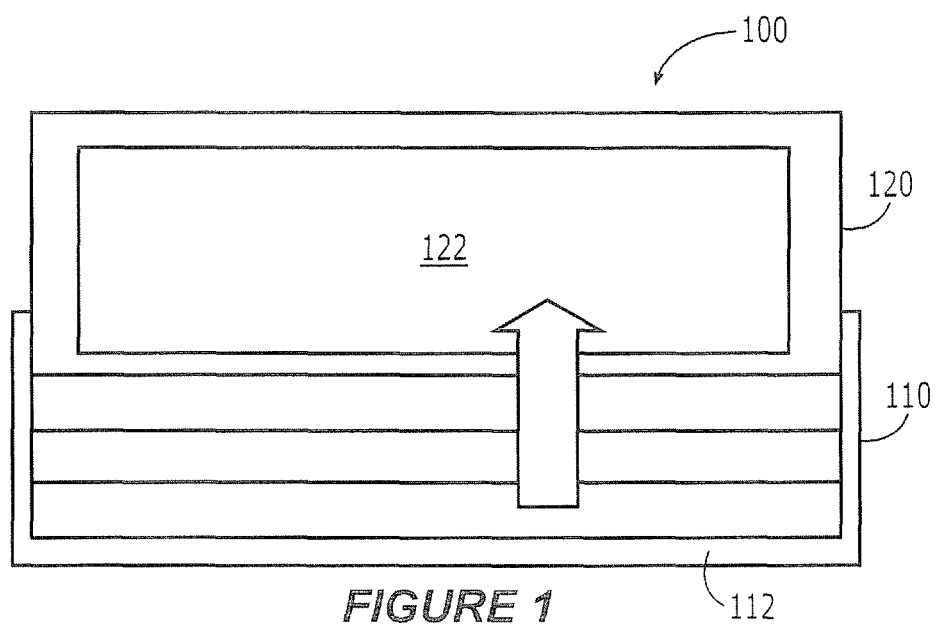
FIG. 1 is a front view of an electronic device that has a keyboard and a display screen on separate housings that can be slid between a closed arrangement, where the display screen covers the keyboard, and an open arrangement, where the keyboard is exposed, in accordance with some embodiments.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of components illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape or relative sizes of components of a devices and are not intended to limit the scope of the invention.

Some embodiments of the present invention are directed to providing an electronic device having a pair of housings, one of which includes a keyboard and the other includes a display screen. The housings are configured to tilt relative to each other responsive to movement of one housing relative to the other. Tilting one housing relative to the other may improve viewing of images that are displayed on the display screen while a user's eyes are also positioned to view the keyboard for typing.

In some further embodiments, the spacing between the housings is increased responsive to the housings being moved apart to an open arrangement, and the spacing decreases responsive to the housings being moved to a closed arrangement. Increasing the spacing between the housings as they are slid to the open arrangement may reduce/avoid interference to their movement from keyboard collision and/or may reduce/avoid one of the housings wearing away an upper surface of the keyboard.

Figure 2:
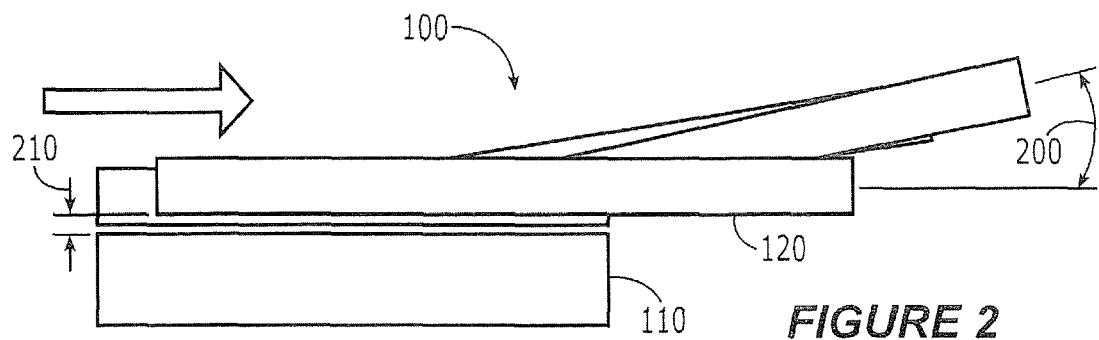
FIG. 2 is a side view of the electronic device of FIG. 1 that illustrates how the spacing and tilt angle between the housings are controlled responsive to the housings being slid between the open and closed arrangements in accordance with some embodiments.

FIGS. 1 and 2 illustrate an exemplary electronic device in accordance with some embodiments of the present invention. FIG. 1 is a front view of an electronic device 100 that has a keyboard 112 that is partially disposed within a first housing 110 and a display screen 122 that is partially disposed within a second housing 120. FIG. 2 is a side view of the electronic device of FIG. 1 that illustrates how the spacing and tilt angle between the housings 110 and 120 are controlled responsive to the housings 110 and 20 being slid between open and closed arrangements in accordance with some embodiments.

Referring to FIGS. 1 and 2, the display screen 122 can be slid in the direction of the illustrated arrow to move from the closed arrangement, where the keyboard 112 is at least substantially covered by the housing 120, to an open arrangement where the keyboard 112 is exposed to allow a user to type thereon. In the closed arrangement, a bottom surface of the housing 120 may rest on upper surfaces of keys of the keyboard 112 to compress the keys and provide a thinner device side profile. As the housings 110 and 120 are slid to the open arrangement, the second housing 120 can be lifted away from the first housing 110, such as by operation of exemplary cam assemblies described below, to increase the spacing 210 therebetween and avoid collision between the bottom surface of the housing 120 and the keyboard 112. For example, the spacing 210 between the housings 110 and 120 may be increased by, for example, about 1-2 mm in the open arrangement compared to the closed arrangement.

Alternatively or additionally, as the housings 110 and 120 are slid open, the second housing 120 is tilted relative to the first housing 110, such as by operation of the exemplary cam assemblies described below, so that the display screen 122 leans toward the keyboard 112, which may improve viewing of images that are displayed on the display screen 122 while a user's eyes are also positioned to view the keyboard 112 while typing. For example, the tilt angle 200 between planar upper surfaces of the display screen 122 and the keyboard 112 may, for example, change from about 0° for the closed arrangement to about 7°-15° for the open arrangement.

The exemplary embodiments that are shown and described with regard to FIGS. 1-2 are provided for purposes of explanation only. It is to be understood that the present invention is not limited to such configurations, and is intended to encompass any configuration capable of carrying out at least one of the operational embodiments described herein. For example, although the display screen 122 has been illustrated as being in the second housing 120 and the keyboard 112 has been illustrated as being in the first housing 110, their respective locations may be switched and/or may be configured according to other arrangements. Moreover, as used herein, the term "keyboard" refers to a user input interface that includes a plurality of physical and/or virtual keys and/or buttons and may include, but is not limited to, a numeric keypad, a partial alphabetic keyboard, and/or a QWERTY keyboard.

Figure 3:
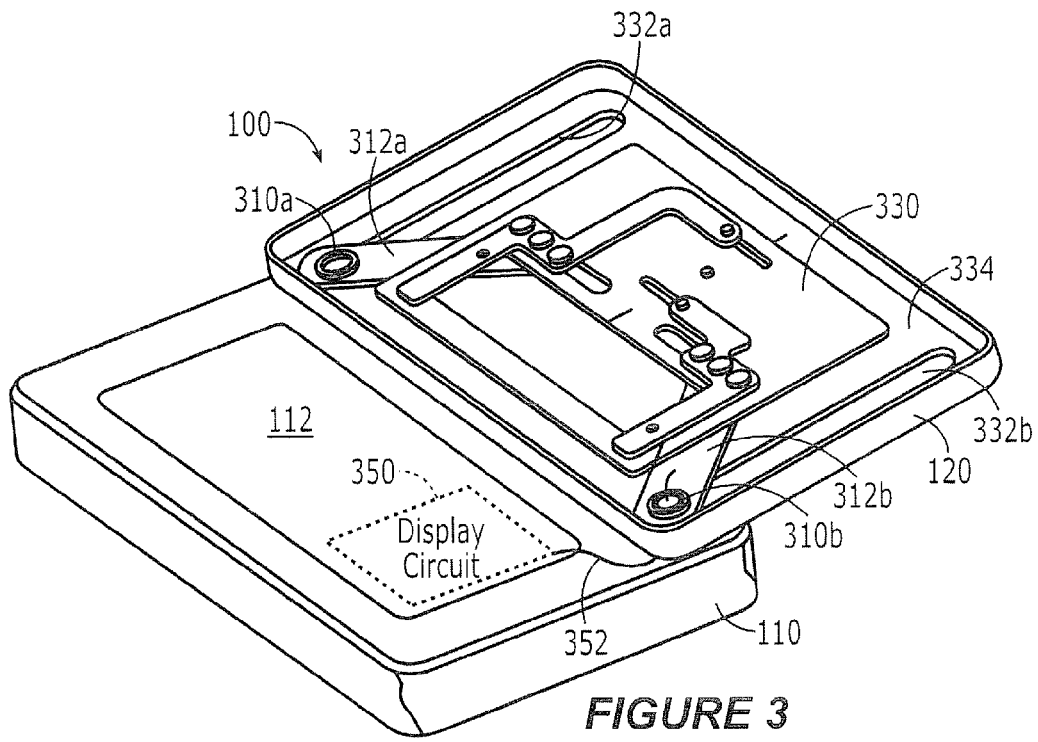
FIG. 3 is partially assembled view of the electronic device of FIGS. 1 and 2 that illustrates cam assemblies and actuator arms that are configured to control spacing and tilt angle between the housings responsive to the housings being slid between the open and closed arrangements in accordance with some embodiments.

FIG. 3 is a partially assembled view of the electronic device 100 of FIGS. 1 and 2 that illustrates a pair of cam assemblies 310a-b and a pair of actuator arms 312a-b that connect the housings 110 and 120 and control spacing 210 and tilt angle 200 between the housings 110 and 120 responsive to their being slid between the open and closed arrangements in accordance with some embodiments. Referring to FIG. 3, the second housing 120 can include a support platform 330 that can be configured to connect to and support the display screen 122. An exterior surface 334 of the second housing 120 can include a pair of spaced apart slots 332a-b.

The cam assemblies 310a-b are configured to tilt relative to each other responsive to rotation of parts thereof. The cam assemblies 310a-b are connected to spaced apart locations on the first housing 110. The cam assemblies 310a-b extend from the connected first housing 110 through the slots 332a-b in the exterior surface 334 to connect to one end of each actuator arm 312a-b. The actuator arms 312a-b are connected on another end to spaced apart locations on the support platform 330. Sliding the first housing 110 relative to the second housing 120 (e.g., in the direction of the arrow shown in FIG. 1 or opposite thereto) causes the cam assemblies 310a-b to have translational movement (to slide) along the slots 332a-b in the exterior surface 334.

Moreover, as the first and second housings 110 and 120 are slid from the closed arrangement to the open arrangement, the actuator arms 312a-b angularly rotate in opposite relative directions which turns a part of the cam assembly 310b in a clockwise direction and turns a part of the other cam assembly 310a in a counter-clockwise direction. The cam assembly 310b is configured to respond to clockwise rotation of the part by tilting in a first direction and the second cam assembly is oppositely configured to respond to counter-clockwise rotation of the part by also tilting in the first direction. The tilt angle of the cam assemblies 310a-b is transferred through the actuator arms 312a-b to the support platform 330, which causes the display screen 122 in the second housing 120 to tilt toward the keyboard 112 in the first housing 110 (i.e., increases the tilt angle 200 between the housings 110 and 120).

Similarly, sliding the first and second housings 110 and 120 from the open arrangement to the closed arrangement causes the actuator arms 312a-b to rotate in opposite relative directions which turns the part of the cam assembly 310b in a counter-clockwise direction and turns the part of the other cam assembly 310a in a clockwise direction. As a result, the cam assemblies 310a-b both tilt in a second direction, opposite to the first direction, which causes the display screen 122 in the second housing 120 to tilt away from the keyboard 112 in the first housing 110 (i.e., decreases the tilt angle 200 between the housings 110 and 120).

Various electronic circuitry is contained in the first housing 110. For example, a display circuit 350 is configured to generate signals that control text/graphics that are displayed on the display screen 122 in the second housing 120. These signals are conducted through display wires 352 that may extend from the display circuit 350 through one or both of the cam assemblies 310a-b to connect to the display screen 122. Routing the display wires 352 through one or both cam assemblies 310a-b may protect the wires during operation by a user and/or may make the device 100 more aesthetically pleasing.

Figure 4:
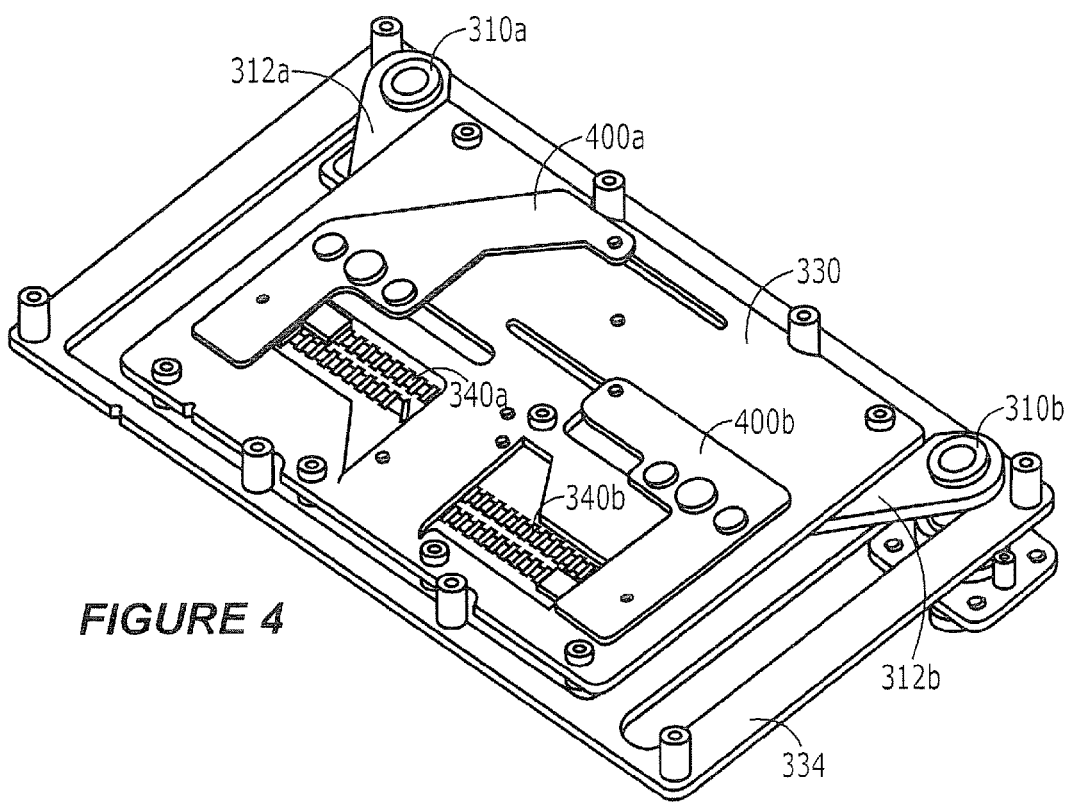
FIG. 4 is a top isometric view of the cam assemblies and actuator arms of the upper housing of FIG. 3 in a closed arrangement in accordance with some embodiments.

FIG. 4 is a top view of the cam assemblies 310a-b, the actuator arms 312a-b, and a further portion of the support platform 330 of FIG. 3 with the housings 110 and 120 in the closed arrangement in accordance with some embodiments. Referring to FIG. 4, the actuator arms 312a-b can be connected to a pair of brackets 400a-b that slide across the support platform 330 to allow angular rotation of the actuator arms 312a-b as the housings 110 and 120 are moved between the open and closed arrangements. Springs 340a-b extend from the brackets 400a-b to the support platform 330 to provide actuating forces that facilitate movement of the housings 110 and 120 between the open and closed arrangements. The display screen 122 may be mounted to the brackets 400a-b.

Figure 5:
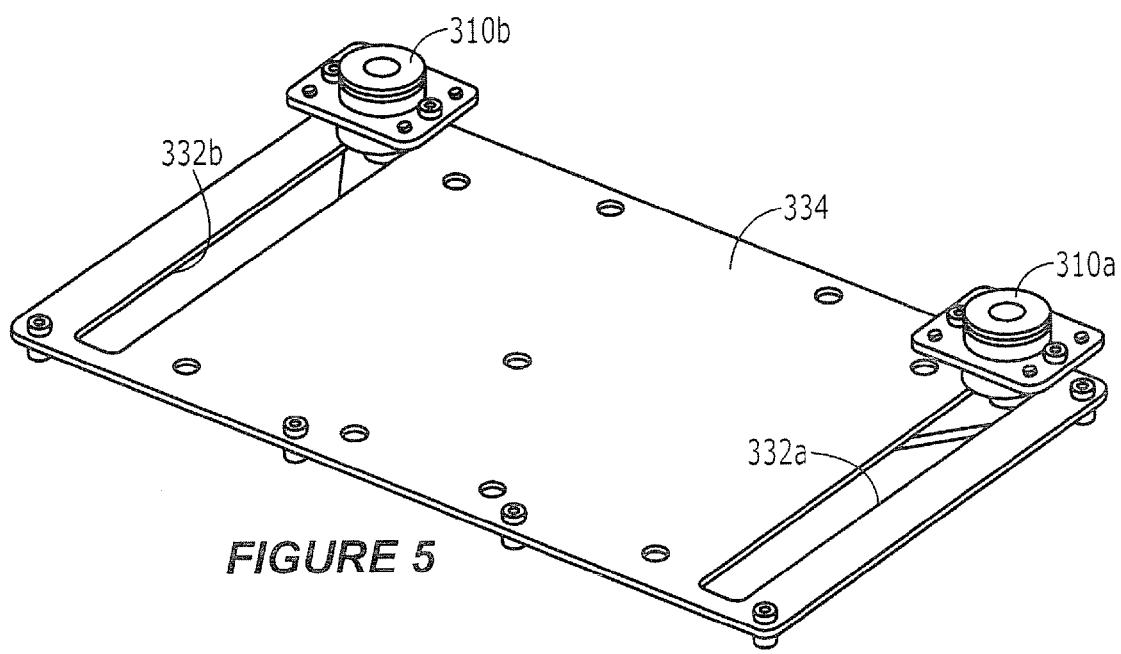
FIG. 5 is a bottom isometric view of the cam assemblies and actuator arms of the upper housing of FIG. 4 in a closed arrangement in accordance with some embodiments.

FIG. 5 is a bottom view of the cam assemblies 310a-b, the actuator arms 312a-b, and the support platform 330 of FIG. 4 in the closed arrangement in accordance with some embodiments. Referring to FIG. 5, the cam assemblies 310a-b extend from the actuator arms 312a-b through the slots 332a-b to connect to the actuator arms 312a-b. The cam assemblies 310a-b slide along and are guided by the slots 332a-b as the housings 110 and 120 are moved between the open and closed arrangements.

Figure 6:
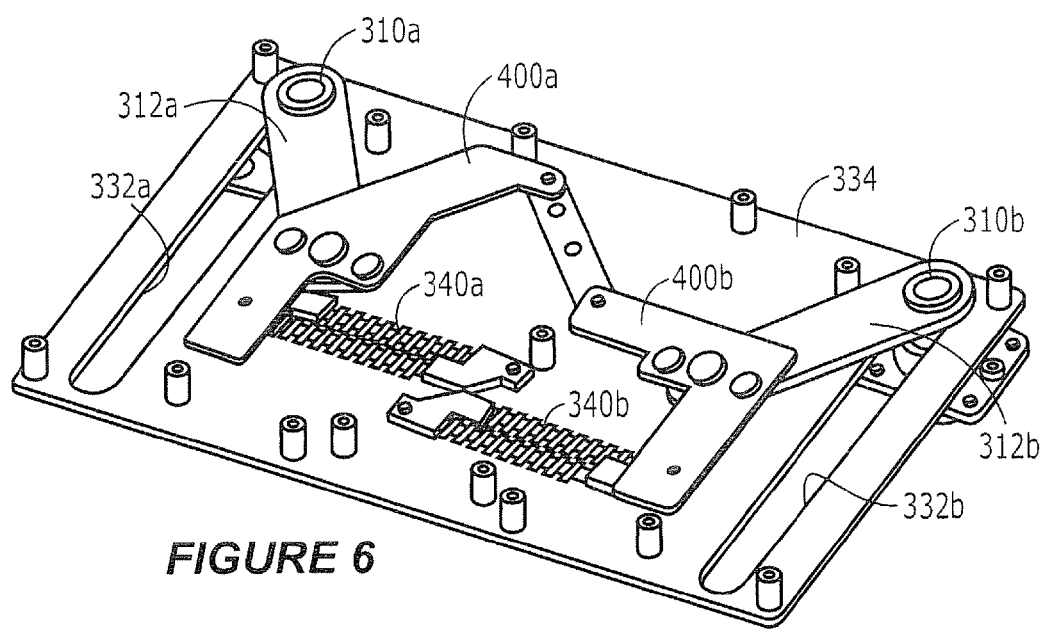
FIG. 6 is another top isometric view of some structure of the upper housing of FIG. 4 to show further details of the cam assemblies and actuator arms in accordance with some embodiments.
Figure 7:
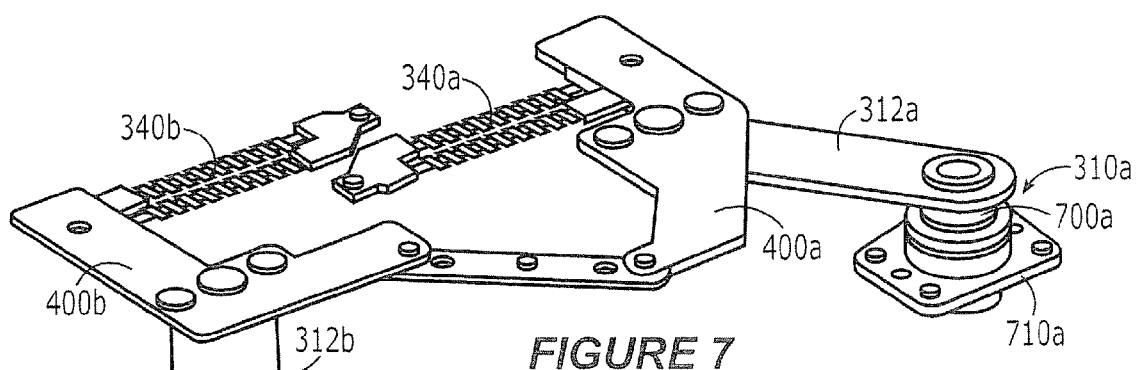
FIG. 7 is another top isometric view of some structure of the upper housing of FIG. 6 to show further details of the cam assemblies and actuator arms in an open arrangement in accordance with some embodiments.
Figure 8:
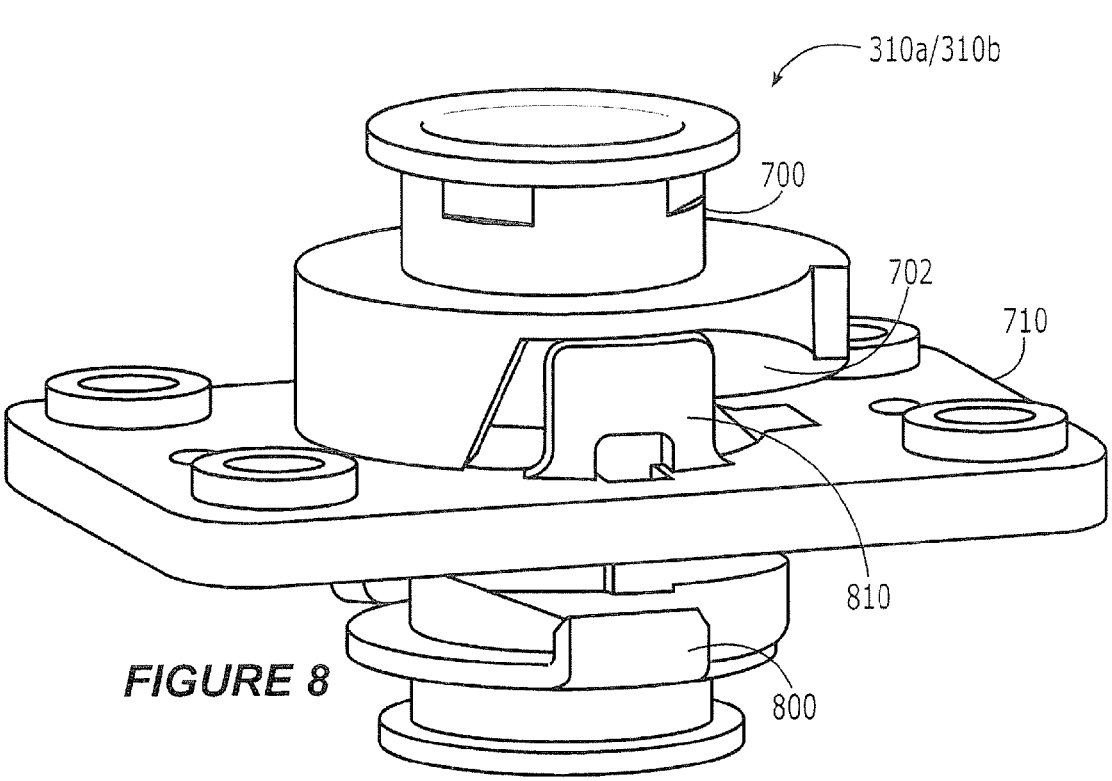
FIG. 8 is an enlarged isometric view of the cam assembly of FIGS. 3-7 in accordance with some embodiments.
Figure 9:
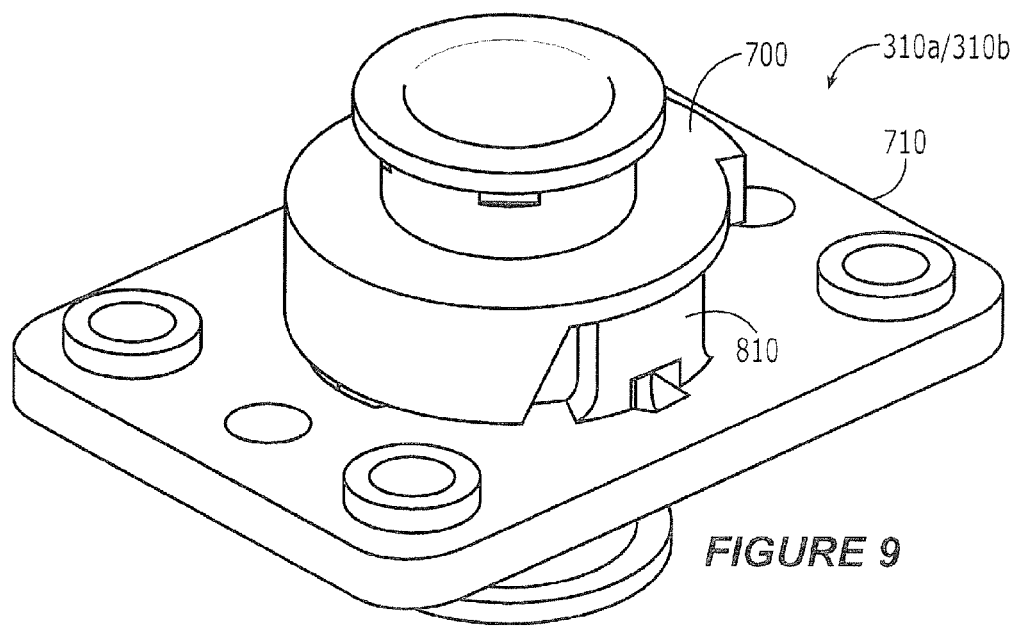
FIG. 9 is another isometric view of the cam assembly of FIGS. 3-7 that illustrate further structure thereof in accordance with some embodiments.
Figure 10:
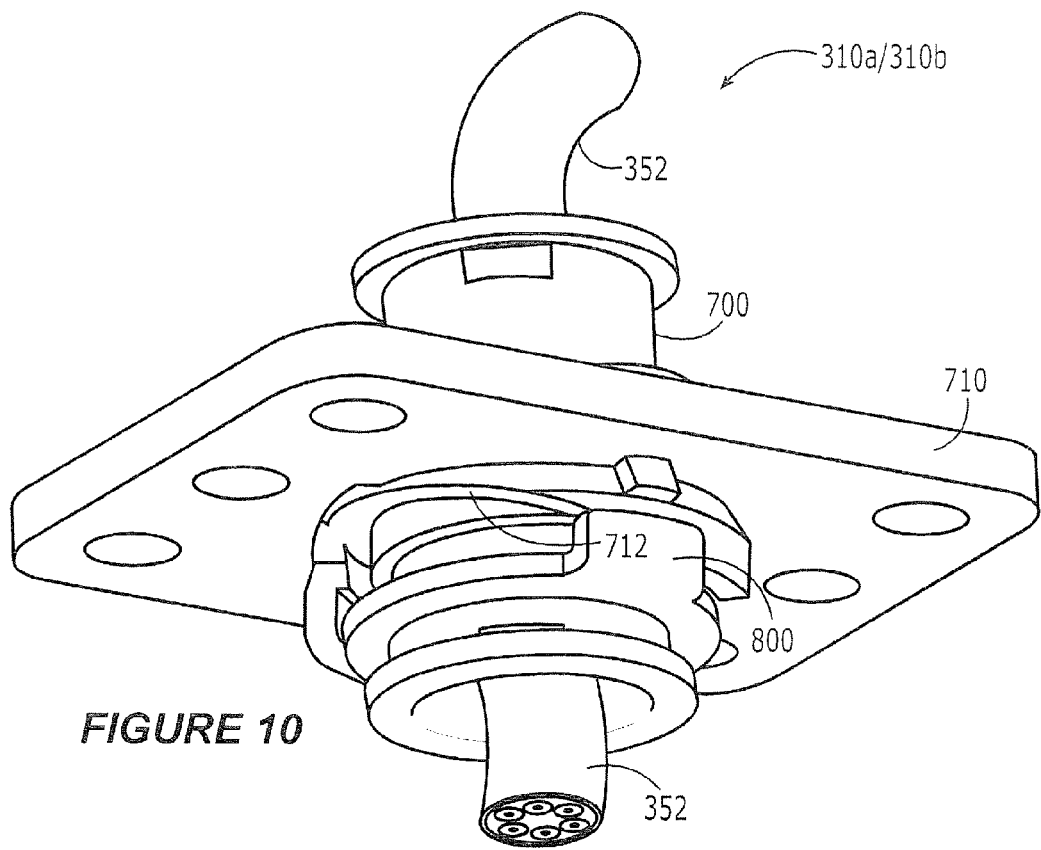
FIG. 10 is another isometric view of the cam assembly of FIG. 9 that has been flipped over to illustrate further structure thereof in accordance with some embodiments.

FIG. 6 is another top view of some structure of the upper housing 120 of FIG. 4, and shows further details of the cam assemblies 310a-b, the actuator arms 310a-b, the brackets 400a-b, and the springs 340a-b in the closed arrangement in accordance with some embodiments. FIG. 7 is another top view of some structure of the upper housing 120 of FIG. 6 and show further detail of the cam assemblies 310a-b, the actuator arms 310a-b, the brackets 400a-b, and the springs 340a-b in the open arrangement in accordance with some embodiments. FIG. 8 is an enlarged view of the cam assembly 310a/310b of FIGS. 3-7 in accordance with some embodiments. FIG. 9 is another view of the cam assembly 310a/310b of FIG. 8 in accordance with some embodiments. FIG. 10 is another view of the cam assembly 310a/310b of FIG. 8 that has been flipped over to illustrate further structure thereof in accordance with some embodiments.

Referring to FIGS. 6-10, each cam assembly 310a/310b includes first and second connection parts 700 and 710 that are rotationally connected to each other. The second connection part 710 is connected to the lower housing 110. The first connection part 700 is connected to an end of one of the actuator arms 312a/b. As the housings 110 and 120 are slid apart from the closed arrangement to the open arrangement, the cam assemblies 310a-b slide down the slots 332a-b and the actuator arms 312a-b pivot the first connection part 700 relative to the second connection part 710. The cam assemblies 310a-b are configured so that the first and second connection parts 700-710 tilt relative to each other responsive to rotation of one part relative to the other part. The angular tilt is transferred to the lower housing 110 and, through the actuator arms 312a-b, to the upper housing 120 to cause the housings 110 and 120 to tilt relative to each other.

Sliding the upper housing 120 relative to the lower housing 110 from the closed arrangement to the open arrangement rotates the actuator arms 312a-b in opposite relative directions and causes rotation between the first and second connection parts 700-710 of the cam assembly 310a in a clockwise direction. Such sliding causes opposite rotation between the first and second connection parts 700-710 of the other cam assembly 310b in a counter-clockwise direction. The cam assembly 310a is configured to respond to clockwise rotation by tilting its first connection part 700 in a first direction relative to the second connection part 710, and the other cam assembly 310b is configured to respond to counter-clockwise rotation by tilting its first connection part 700 in the first direction relative to the second connection part 710. In this manner, the tilt angle 200 (FIG. 2) is increased as the housings 110 and 120 are slid to the open arrangement, and is decreased as the housings 110 and 120 are slid to the closed arrangement.

Further details of the exemplary cam assemblies 310a-b are shown in FIGS. 8-10. Referring to FIGS. 8-9, the first and second connection parts 700 and 710 can include cylindrical portions. The cylindrical portion of the first connection part 700 can have a sloped face 702, and the second connection part 710 can include a flange 810 that presses against and rides along the sloped face 702 of the cylindrical portion of the first connection part 700 as the first connection part 700 is rotated relative to the second connection part 710. The force exerted by the flange 810 on the sloped face 702 causes the first connection part 700 to tilt relative to the second connection part 710 and, thereby, regulates the tilt angle 200 between the first and second connection parts 700 and 710.

Referring to FIG. 10, the cylindrical portion of the second connection part 710 can have a sloped face 712 that is spaced apart on an opposite side of the exterior surface 334 of the second housing 120 from the first sloped face 702. The first cylindrical part can include a flange 800 that presses against and rides along the sloped face 712 of the second connection part 710 as the first connection part 700 is rotated relative to the second connection part 710 to push the second connection part 710 away from the first connection part 700 and regulate distance between the first and second housings. The force exerted by the flange 800 on the sloped face 712 regulates spacing between the first and second connection parts 700 and 710 and, thereby, spacing 210 between the first and second housings 110 and 120.

As explained above regarding FIG. 3, the display wires 352 from the display circuit 350 may be routed through one or both of the cam assemblies 301a-b to the display screen 122. FIG. 10 illustrates the display wires 352, which may be bundled as a cable or other signal communication medium (e.g., flexible printed circuit), passing through the cylindrical portions of the first and second parts 700-710.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An electronic device comprising:
   first and second housings, wherein one of first and second housings comprises a keyboard and the other housing comprises a display screen;
   a pair of cam assemblies each having first and second connection parts that are rotationally connected, wherein each cam assembly is configured so that the first and second connection parts tilt relative to each other responsive to rotation of one relative to the other, wherein the first connection parts of both cam assemblies are connected to spaced apart locations on the first housing;
   a pair of actuator arms that are connected on one end to spaced apart locations on the second housing and are connected on the other end to different ones of the second connection parts of both cam assemblies, wherein relative movement of the first and second housings rotates the first connection part relative to the second connection part of both cam assemblies and tilts the first housing relative to the second housing; and wherein the first connection part of each cam assembly has a cylindrical portion with a sloped face; the second connection part of each cam assembly comprises a flange that presses against and rides along the sloped face of the first connection part as the first connection part is rotated relative to the second connection part to tilt the first connection part relative to the second connection part and tilt the first housing relative to the second housing.

2. The electronic device of claim 1, wherein:
   the cam assemblies are further configured to tilt the first housing in a first angular direction relative to the second housing in response to sliding the first housing relative to the second housing in a first direction, and are configured to tilt the first housing in an opposite second angular direction relative to the second housing in response to sliding the first housing relative to the second housing in an opposite second direction.

3. The electronic device of claim 2, wherein:
   the cam assemblies are further configured to increase separation between the first and second housings in response to sliding the first housing relative to the second housing in the first direction, and are configured to decrease separation between the first and second housings in response to sliding the first housing relative to the second housing in the second direction.

4. The electronic device of claim 2, wherein:
   the first housing comprises the keyboard;
   the second housing comprises the display screen; and
   the cam assemblies are configured to tilt the display screen of the second housing toward the keyboard of the second housing responsive to the first and second housings being slid toward an open arrangement that exposes the keyboard from underneath the display screen.

5. The electronic device of claim 4, wherein:
   the cam assemblies slide along a corresponding pair of slots that are defined in an exterior surface of the second housing as the first and second housings are moved relative to each other in a direction along the slots; and
   the actuator arms extend between the display screen and the exterior surface of the second housing.

6. The electronic device of claim 4, wherein:
the cam assemblies are configured to tilt the display screen of the second housing away from the keyboard of the first housing responsive to the first and second housings being slid toward a closed arrangement that covers the keyboard underneath the display screen.

7. The electronic device of claim 6, wherein:
the cam assemblies are configured to hold the first and second housings parallel to each other with a corresponding 0 degree tilt angle responsive to the second housing overlying the keyboard of the first housing, and are configured to tilt the display screen of the second housing at least 7 degrees toward the keyboard of the first housing in response to the first and second housings being slid to the open arrangement that exposes the keyboard from underneath the second housing.

8. The electronic device of claim 4, wherein:
the cam assemblies are configured to increase separation between facing surfaces of the first and second housings responsive to the first and second housings being slid toward the open arrangement, and to decrease separation between facing surfaces of the first and second housings responsive to the first and second housings being slid toward the closed arrangement.

9. The electronic device of claim 8, wherein:
the cam assemblies are configured to increase separation between facing surfaces of the first and second housings a sufficient amount to avoid contact between the keyboard of the first housing and a facing surface of the second housing as the first and second housings are slid from the closed arrangement to the open arrangement.

10. The electronic device of claim 1, wherein each cam assembly further comprises a cylindrical spring that extends around a portion of the first connection part and presses the flange of the second connection part against the sloped face of the first connection part to tilt the first connection part relative to the second connection part as the first and second connection parts are rotated relative to each other.

11. The electronic device of claim 1:
wherein the second connection part comprises a cylindrical portion that is axially aligned with the cylindrical portion of the first connection part, the cylindrical portion of the second connection part has a sloped face that is spaced apart on an opposite side of an exterior surface of the second housing from the sloped face of the first connection part; and
wherein the first cylindrical part comprises a flange that presses against and rides along the sloped face of the second connection part as the first connection part is rotated relative to the second connection part to push the sloped face of the second connection part away from the exterior surface of the second housing and regulate separation between the first and second housings as the first and second housings are moved relative to each other.

12. The electronic device of claim 1, wherein:
the cam assemblies slide along a corresponding pair of slots that are defined in an exterior surface of the second housing as the first and second housings are moved relative to each other in a direction along the slots, and the slots guide the sliding movement of the cams as the first and second housing are moved relative to each other in the direction along the slots.

13. The electronic device of claim 12, wherein:
the cam assemblies extend through the slots to rotationally connect the first housing and the end of the actuator arm.

14. The electronic device of claim 1, wherein:
sliding the first housing relative to the second housing rotates the actuator arms in opposite relative directions and causes rotation between the first and second connection parts of a first one of the cam assemblies in a clockwise direction and causes rotation between the first and second connection parts of a second one of the cam assemblies in a counter-clockwise direction, wherein the first cam assembly is configured to respond to clockwise rotation by tilting its first connection part in a first direction relative to the second connection part and the second cam assembly is configured to respond to counter-clockwise rotation by tilting its first connection part in the first direction relative to the second connection part.

15. The electronic device of claim 1, further comprising:
a display circuit that resides in the first housing and is configured to generate signals that regulate images displayed by the display screen; and
display wires that extend from the display circuit through at least one of the cam assemblies interconnecting the first and second housings to electrically connect to the display screen.

16. An electronic device comprising:
first and second housings, wherein one of first and second housings comprises a keyboard and the other housing comprises a display screen;
a pair of cam assemblies each having first and second connection parts that are rotationally connected, wherein each cam assembly is configured so that the first and second connection parts tilt relative to each other responsive to rotation of one relative to the other, wherein the first connection parts of both cam assemblies are connected to spaced apart locations on the first housing; and
a pair of actuator arms that are connected on one end to spaced apart locations on the second housing and are connected on the other end to different ones of the second connection parts of both cam assemblies, wherein relative movement of the first and second housings rotates the first connection part relative to the second connection part of both cam assemblies and tilts the first housing relative to the second housing,
wherein the cam assemblies are further configured to tilt the first housing in a first angular direction relative to the second housing and to increase separation between the first and second housings in response to sliding the first housing relative to the second housing in a first direction, and are configured to tilt the first housing in an opposite second angular direction relative to the second housing and to decrease separation between the first and second housings in response to sliding the first housing relative to the second housing in an opposite second direction, and wherein the first connection part of each cam assembly has a cylindrical portion with a sloped face; the second connection part of each cam assembly comprises a flange that presses against and rides along the sloped face of the first connection part as the first connection part is rotated relative to the second connection part to tilt the first connection part relative to the second connection part and tilt the first housing relative to the second housing.

17. The electronic device of claim 16, wherein:
the first housing comprises the keyboard;
the second housing comprises the display screen; and
the cam assemblies are configured to tilt the display screen of the second housing toward the keyboard of the second housing and to increase separation between facing surfaces of the first and second housings in response to the first and second housings being slid toward an open arrangement that exposes the keyboard from underneath the display screen.

18. The electronic device of claim 17, wherein:
the cam assemblies are configured to tilt the display screen of the second housing away from the keyboard of the second housing and to decrease separation between facing surfaces of the first and second housings in response to the first and second housings being slid toward a closed arrangement that covers the keyboard underneath the display screen.

19. The electronic device of claim 18, wherein:
sliding the first housing relative to the second housing rotates the actuator arms in opposite relative directions and causes rotation between the first and second connection parts of a first one of the cam assemblies in a clockwise direction and causes rotation between the first and second connection parts of a second one of the cam assemblies in a counter-clockwise direction, wherein the first cam assembly is configured to respond to clockwise rotation by tilting its first connection part in a first direction relative to the second connection part and the second cam assembly is configured to respond to counter-clockwise rotation by tilting its first connection part in the first direction relative to the second connection part.

* * * * *

UNITED STATES PATENT AND TRADEMARK OFFICE
CERTIFICATE OF CORRECTION

PATENT NO. : 8,149,581 B2 Page 1 of 1
APPLICATION NO. : 12/641702
DATED : April 3, 2012
INVENTOR(S) : Ma et al.

It is certified that error appears in the above-identified patent and that said Letters Patent is hereby corrected as shown below:

On Title Page:
Item (73) Assignee: Please correct "Sony Ericssom Mobile"
to read -- Sony Ericsson Mobile --

Signed and Sealed this
Seventeenth Day of July, 2012

David J. Kappos
*Director of the United States Patent and Trademark Office*